US012750631B2

(12) United States Patent
Ye et al.

(10) Patent No.: US 12,750,631 B2
(45) Date of Patent: Sep. 29, 2026

(54) AUDIO RENDERING METHOD, AUDIO RENDERING APPARATUS AND ELECTRONIC APPARATUS

(71) Applicant: Beijing Zitiao Network Technology Co., Ltd., Beijing (CN)

(72) Inventors: Xuzhou Ye, Beijing (CN); Chuanzeng Huang, Beijing (CN); Junjie Shi, Beijing (CN); Zhengpu Zhang, Beijing (CN); Derong Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 196 days.

(21) Appl. No.: 18/618,891

(22) Filed: Mar. 27, 2024

(65) Prior Publication Data

US 2024/0292174 A1 Aug. 29, 2024

Related U.S. Application Data

(63) Continuation of application No. PCT/CN2022/122204, filed on Sep. 28, 2022.

(30) Foreign Application Priority Data

Sep. 28, 2021 (WO) ................ PCT/CN2021/121135

(51) Int. Cl.
*H04S 7/00* (2006.01)
*G10L 25/18* (2013.01)

(52) U.S. Cl.
CPC .......... *H04S 7/303* (2013.01); *H04S 2420/03* (2013.01)

(58) Field of Classification Search
None
See application file for complete search history.

(56) References Cited

U.S. PATENT DOCUMENTS

2005/0182608 A1 8/2005 Jahnke
2012/0155653 A1* 6/2012 Jax ........................ G10L 19/008 381/23

FOREIGN PATENT DOCUMENTS

CN 102622518 A 8/2012
CN 112365900 A 2/2021
(Continued)

OTHER PUBLICATIONS

English translation of “KR102226120” provided by EPO (Year: 2021).*
(Continued)

*Primary Examiner* — Qin Zhu
(74) *Attorney, Agent, or Firm* — Astute IP Law Group

(57) ABSTRACT

The present disclosure relates to an audio rendering method, an audio rendering device, and an electronic device. The audio rendering method comprises: acquiring scene-related audio metadata, the scene-related audio metadata comprising related information of a sound propagation path between a sound source and a listener; determining a parameter for audio rendering on the basis of the scene-related audio metadata, the parameter for audio rendering comprising an energy attenuation coefficient for each sound propagation path: performing spatial encoding on an audio signal of the sound source on the basis of the parameter for audio rendering to obtain an encoded audio signal; and performing spatial decoding on the encoded audio signal to obtain a decoded audio signal for audio rendering.

18 Claims, 7 Drawing Sheets

(56) References Cited

FOREIGN PATENT DOCUMENTS

| | | | | |
|---|---|---|---|---|
| CN | 112771894 | A | 5/2021 | |
| KR | 102226120 | B1 * | 3/2021 | ............. H04S 7/303 |
| WO | 2020187807 | A1 | 9/2020 | |

OTHER PUBLICATIONS

International Search Report issued in International Patent Application No. PCT/CN2022/122204 on Dec. 2, 2022.

* cited by examiner

AUDIO RENDERING METHOD, AUDIO RENDERING APPARATUS AND ELECTRONIC APPARATUS

CROSS-REFERENCE TO RELATED APPLICATIONS

The present application is a continuation of International Application No. PCT/CN2022/122204, as filed on Sep. 28, 2022, which claims the benefit to the international patent application No. PCT/CN2021/121135 filed on Sep. 28, 2021, which is incorporated by reference in its entirety.

TECHNICAL FIELD

The present disclosure relates to the technical field of audio signal processing, in particular to an audio rendering method, an audio rendering apparatus, an electronic apparatus, a non-transitory computer-readable storage medium and a computer program product.

BACKGROUND

In the spatial audio rendering technology based on ray tracing, each sound propagation path between a listener and a sound source may carry one or a group of energy attenuation coefficients. The factors that affect the energy attenuation coefficient comprise the directivity of a sound source, a reflective surface on a sound propagation path, and an air absorption coefficient, or the like. After attenuation by the energy attenuation coefficient, the original signal of the sound source may be represented by a signal exhibited when sound is propagated through this path and finally reaches a listener.

However, when the sound propagation path with these characteristics is blocked, if no processing is performed, the energy of this path will disappear instantaneously. The instantaneously disappearing energy will generate an extremely steep volume step in the direction of this path, which produces perceptible noises such as clicking.

Conversely, when a sound propagation path is just found, energy will suddenly appear in the direction of this path. The instantaneously enhanced energy will cause perceptible noises in the direction of this path for the same reason.

Furthermore, the instantaneously disappearing path energy might also cause the reflected sound energy to lose the time continuity of direction. In some path caching mechanisms based on the principle of sequential coherence, a path that is blocked and zero cleared in energy will be deleted immediately. However, if this path is only temporarily blocked, for example, a vehicle passes by a listener's side, and the path A sent from the side is temporarily blocked; when the vehicle passes fast, the path A is supposed to continue to exist. However, in fact, the path A will be completely deleted.

SUMMARY

According to some embodiments of the present disclosure, an audio rendering method is provided, which comprises: obtaining scene-related audio metadata, wherein the scene-related audio metadata comprises relevant information of a sound propagation path between a sound source and a listener; determining a parameter for audio rendering based on the scene-related audio metadata, wherein the parameter for audio rendering comprises an energy attenuation coefficient for each sound propagation path; performing spatial audio coding on an audio signal of the sound source based on the parameter for audio rendering so as to obtain an encoded audio signal; and performing spatial audio decoding on the encoded audio signal so as to obtain a decoded audio signal for audio rendering.

According to some other embodiments of the present disclosure, an audio rendering apparatus is provided, which comprises: a metadata obtaining unit configured to obtain scene-related audio metadata, wherein the scene-related audio metadata comprises relevant information of a sound propagation path between a sound source and a listener; a parameter determining unit configured to determine a parameter for audio rendering based on the scene-related audio metadata, wherein the parameter for audio rendering comprises an energy attenuation coefficient for each sound propagation path; a spatial audio encoding unit configured to perform spatial audio encoding on an audio signal of a sound source based on the parameter for audio rendering so as to obtain an encoded audio signal; and a spatial audio decoding unit configured to perform spatial audio decoding on the encoded audio signal so as to obtain a decoded audio signal for audio rendering.

According to further other embodiments of the present disclosure, an electronic apparatus is provided, which comprises: a memory; and a processor coupled to the memory, wherein the processor is configured to perform the audio rendering method according to any of the embodiments recited in the present disclosure based on instructions stored in the memory device.

According to still other embodiments of the present disclosure, a non-transitory computer-readable storage medium is provided, which has a computer program stored thereon, that, when executed by a processor, implements the audio rendering method according to any of the embodiments recited in the present disclosure.

According to yet other embodiments of the present disclosure, a computer program product is provided, which comprises instructions that, when executed by a processor, cause the processor to perform the audio rendering method according to any of the embodiments recited in the present disclosure.

Other features and advantages of the present disclosure will become explicit from the following detailed description of exemplary embodiments of the present disclosure with reference to the accompanying drawings.

BRIEF DESCRIPTION OF THE ACCOMPANYING DRAWINGS

The accompanying drawings described here are intended to provide a further understanding of the present disclosure and constitute a part of the present application; the illustrative embodiments of the present disclosure as well as the descriptions thereof are intended for explaining the present disclosure and do not constitute improper definitions on the present disclosure. In the accompanying drawings.

DETAILED DESCRIPTION

The technical solutions in the embodiments of the present disclosure will be explicitly and completely described below in conjunction with the accompanying drawings in the embodiments of the present disclosure; apparently, the described embodiments are only some embodiments of the present disclosure, rather than all the embodiments. The following descriptions of at least one exemplary embodiment are in fact merely illustrative, and shall by no means serve as any delimitation on the present disclosure as well as its application or use. On the basis of the embodiments of the present disclosure, all the other embodiments obtained by those of ordinary skill in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention. At the same time, it should be understood that, for ease of description, the dimensions of various parts shown in the accompanying drawings are not drawn according to actual proportional relations. The techniques, methods, and apparatuses known to those of ordinary skill in the relevant art might not be discussed in detail, however, the techniques, methods, and apparatuses shall be considered as a part of the granted description where appropriate. Among all the examples shown and discussed here, any specific value shall be construed as being merely exemplary, rather than as being restrictive. Thus, other examples in the exemplary embodiments may have different values. It is to be noted that: similar reference signs and letters present similar items in the following accompanying drawings, and therefore, once an item is defined in one accompanying drawing, it is unnecessary to make further discussion on the same in the subsequent accompanying drawings.

Figure 1:
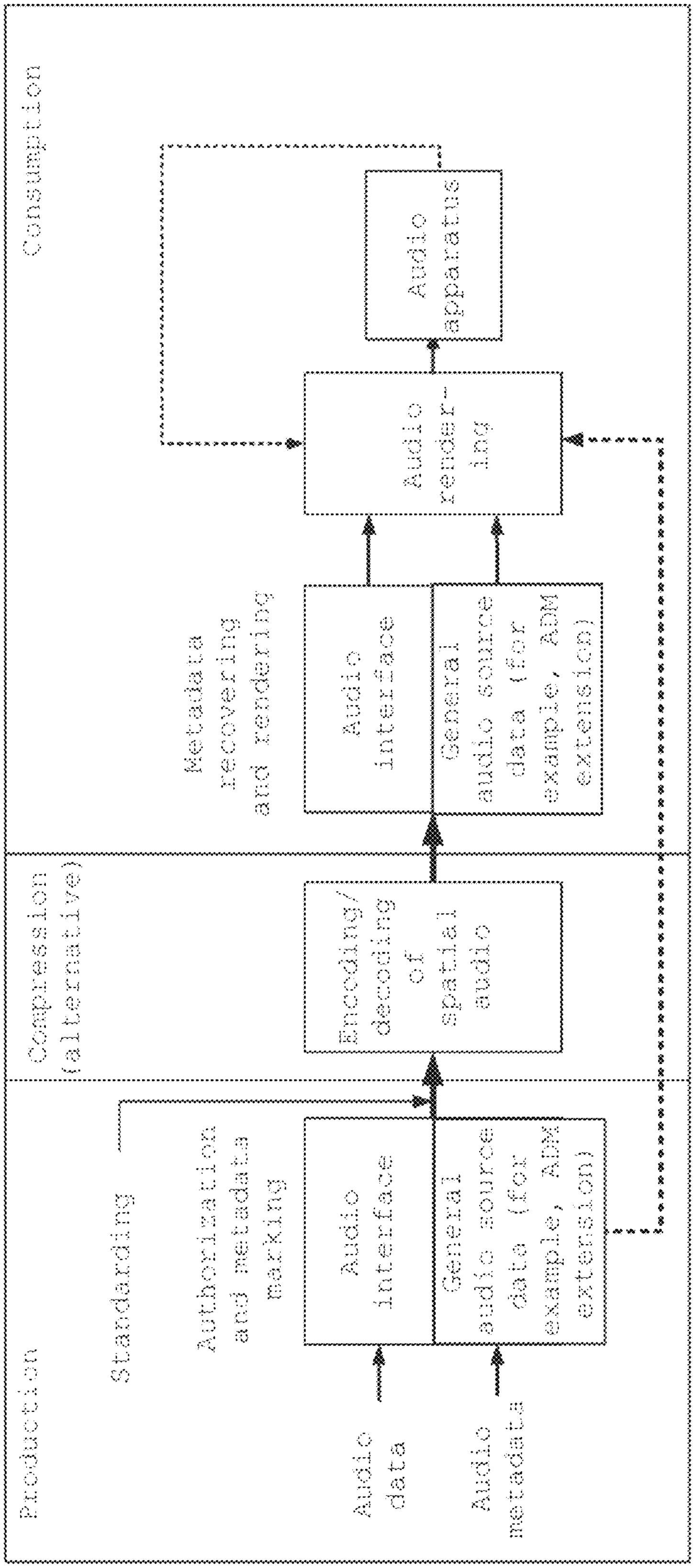
FIG. 1 shows a schematic view of some embodiments of an audio system architecture.

FIG. 1 shows a schematic view of some embodiments of an audio system architecture. Wherein, an exemplary implementation of each stage of an audio rendering process/system is shown, which mainly shows the production and consumption stages in the audio system, and alternatively also comprises an intermediate processing stage, such as compression.

As shown in FIG. 1, on a production side, according to the audio data and the audio source data, authorization and metadata marking are performed by using the audio track interface and the general audio metadata (for example, ADM extension). For example, standardized processing may also be performed.

In some embodiments, a spatial audio encoding and decoding processing is performed for a processing result from the production side, so as to obtain a compression result.

On a consumption side, according to the processing result (or the compression result) from the production side, a metadata recovery and rendering processing is performed by using the audio track interface and the general audio metadata (for example, ADM extension); after an audio rendering process, a processing result is input to the audio apparatus.

In some embodiments, the input of audio processing may comprise scene-related information and metadata, target-based audio signals, FOA (First-Order Ambisonics) microphone, HOA (Higher-Order Ambisonics) microphone, stereo, surround, and the like; and the output of audio processing comprises stereo audio output or the like.

Figure 2:
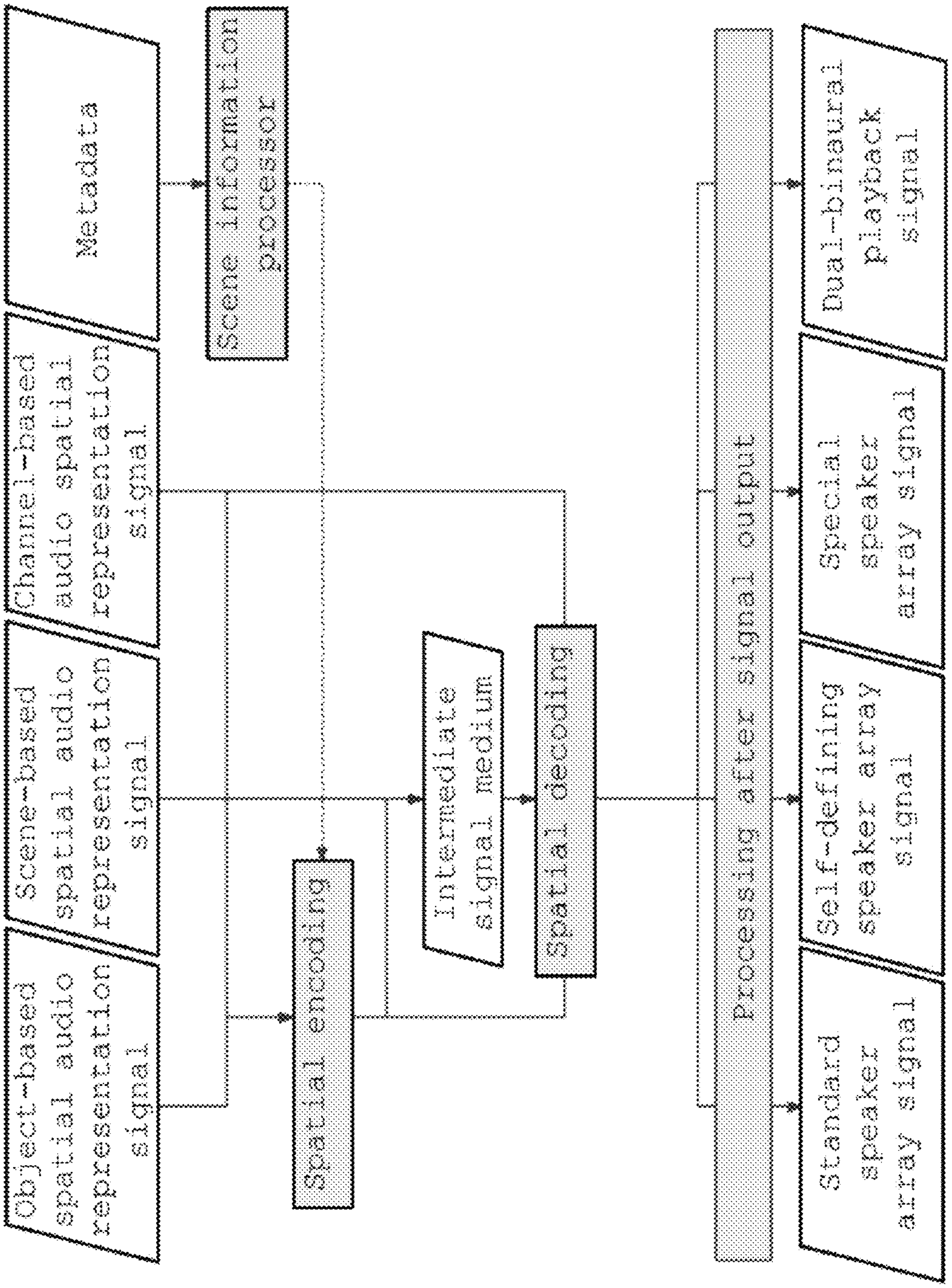
FIG. 2 shows a flow chart of an exemplary implementation of an audio rendering process according to an embodiment of the present disclosure.

An exemplary implementation of audio rendering according to an embodiment of the present disclosure will be described below in conjunction with the accompanying drawings, wherein FIG. 2 shows a flow chart of an exemplary implementation of an audio rendering process according to an embodiment of the present disclosure. As an example, the audio rendering system mainly comprises a rendering metadata system and a core rendering system, wherein the metadata system is present with control information describing the audio content and the rendering technology, for example, whether the input form of an audio load is single-channel, dual-channel, multi-channel, or object or sound field HOA, as well as location information of a dynamic sound source and a listener, and rendered acoustic environment information such as house shape/size and wall constitution. The core rendering system renders the corresponding playback apparatus and environment according to different audio signal representation forms and corresponding metadata parsed from the metadata system.

First of all, an input audio signal is received, and parsing or direct transmission is performed according to a format of the input audio signal. On one hand, when the input audio signal is an input signal in any spatial audio exchange format, the input audio signal may be parsed to obtain an audio signal with a specific spatial audio representation, such as an object-based spatial audio representation signal, a scene-based spatial audio representation signal and a channel-based spatial audio representation signal, as well as associated metadata, and then a parsing result is transferred to a subsequent processing stage. On the other hand, when the input audio signal is directly an audio signal with a specific spatial audio representation, it is not necessary to perform parsing but to directly transfer the same to a subsequent processing stage. For example, such audio signal may be transmitted directly to an audio coding stage, such as a narrative-channel track required to be encoded in an object-based audio representation signal, a scene-based audio representation signal, or a channel-based audio representation signal. Even in the case where the audio signal of a specific spatial representation is of a type/format in which encoding is not required, it is possible to directly transfer the same to an audio decoding stage, such as a non-narrative channel track in a channel-based audio representation after parsing, or a narrative channel track for which encoding is not required.

Then, information processing may be performed based on the obtained metadata, so as to extract and obtain audio a parameter related to each audio signal, and such audio a parameter may serve as metadata information. The information processing here may be performed for either the audio signal obtained by parsing or the audio signal directly transmitted respectively. Of course, as described previously, such information processing is alternatively and is not necessarily performed.

Next, signal coding is performed for the audio signal of a specific spatial audio representation. On one hand, signal encoding may be performed on the audio signal of a specific spatial audio representation based on metadata information, and the obtained encoded audio signal is either transmitted directly to a subsequent audio decoding stage, or an intermediate signal is obtained and then transmitted to a subsequent audio decoding stage. On the other hand, in a case where encoding is not required for the audio signal of the specific spatial audio representation, such audio signal may be transmitted directly to an audio decoding stage.

Then, in the audio decoding stage, the received audio signal may be decoded so as to obtain an audio signal suitable for playback in a user application scene as an output signal, and such output signal may be exhibited to the user through an audio playback apparatus in a user application scene, for example, an audio playback environment.

For the problem that the energy rises or drops abruptly in a path direction resulting from that the sound propagation path is blocked, and the problem that the path is deleted resulting from that the sound propagation path is temporarily blocked so that the path is unavailable after a temporary blocking event is over, the present disclosure provides a solution to smooth the sound effect by adding a "blocked" state to each sound propagation path and setting an energy attenuation coefficient for each path.

The present disclosure defines two states for each sound propagation path of sound: effective and ineffective. When the sound propagation path is effective, there are further two states: blocked and unblocked.

When the energy of a sound propagation path is less than a threshold, the state of the sound propagation path is judged to be ineffective, and the sound propagation path judged to be ineffective is deleted.

When the energy of a sound propagation path is not less than a threshold, the state of the sound propagation path is judged to be effective. When the sound propagation path is judged to be effective, it is continued to detect whether the sound propagation path is blocked. In the case where it is detected that the ray pertaining to the sound propagation path intersects with the scene, it is judged that the sound propagation path is blocked. For the sound propagation path judged to be in the "blocked" state, its energy attenuation coefficient is reduced frame by frame. For the sound propagation path judged to be in the "unblocked" state, its energy attenuation coefficient is increased frame by frame until this coefficient becomes 1.

Figure 3:
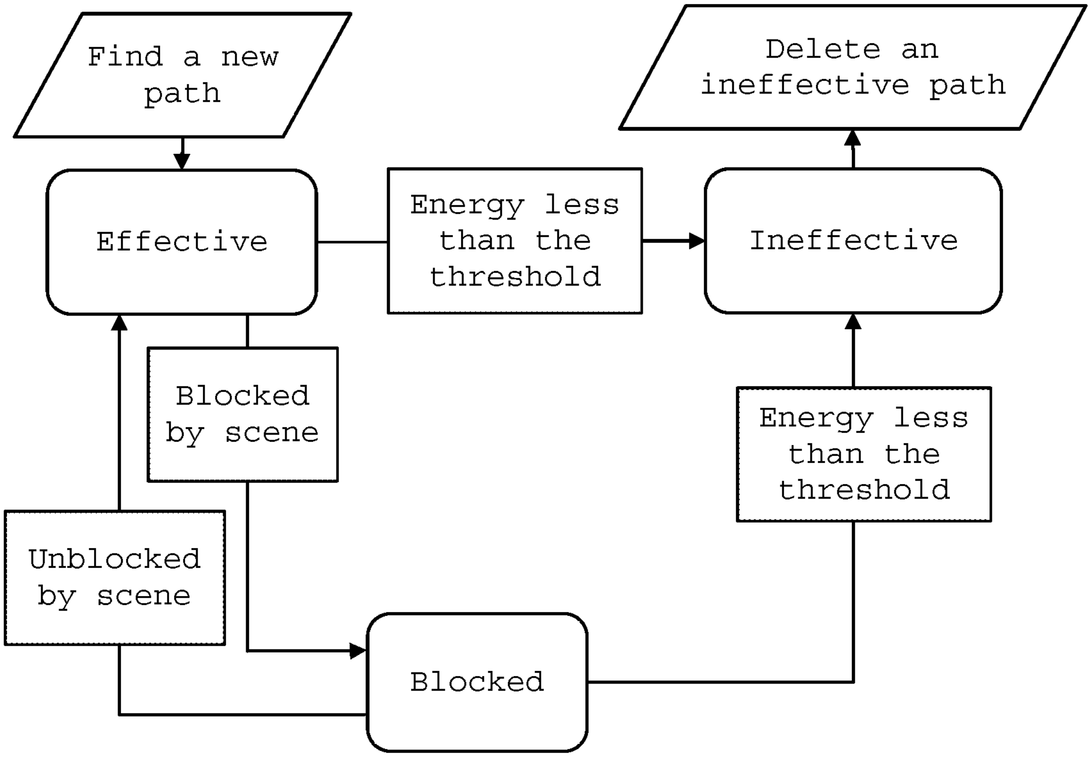
FIG. 3 shows a schematic view of some embodiments of state transition of a sound propagation path upon each rendering.

It should be understood that when a sound path is created, its energy attenuation coefficient is set to be 0. Each time spatial audio rendering is performed, the state of the sound propagation path is detected or judged. FIG. 3 shows a schematic view of state transition of a sound propagation path upon each rendering according to an embodiment of the present disclosure. As shown in FIG. 3, when a new path is created, its state should be "effective", and if it is detected that the ray of the sound propagation path intersects with the scene, it is determined that it is blocked and its state is changed to be "blocked". For example, a vehicle passes by a listener's side and the path A from the side is temporarily blocked, and at this time, the state of the rendered sound propagation path becomes "blocked"; when the vehicle passes fast, the path A continues to exist, and at this time, the state of the rendered sound propagation path becomes "effective" again. When the energy of the sound propagation path is less than a threshold, the sound propagation path is judged to be "ineffective", and the ineffective path will be deleted.

According to some embodiments of the present disclosure, the energy attenuation coefficient g of the sound propagation path is smoothly updated according to a path state upon each rendering, and a common updating method comprises but is not limited to exponential change or linear change.

According to some embodiments of the present disclosure, for example, assuming that $g_{old}$ is an attenuation coefficient obtained during a previous update, that is, an attenuation coefficient of a previous frame, a common exponential change updating method is as follows:

$$g = \begin{cases} g_{old} * \exp, & \text{the path is blocked} \\ \min(1 - \exp * (1 - g_{old}), 1), & \text{the path is unblocked} \end{cases} \quad \text{(formula 1)}$$

Where exp is a preset attenuation speed, which may be set to be 0.9 according to a preferred embodiment of the present invention. It should be understood that this preferred value is only exemplary, but not intended to limit the same. In fact, the preset attenuation speed may be set according to actual needs.

According to other embodiments of the present disclosure, for example, assuming that $g_{old}$ is an attenuation coefficient obtained during a previous update, that is, an attenuation coefficient of a previous frame, a common linear change updating method is as follows:

$$g = \begin{cases} g_{old} - \text{delta}, & \text{the path is blocked} \\ \min((g_{old} + \text{delta}), 1), & \text{the path is unblocked} \end{cases} \quad \text{(formula 2)}$$

Where delta is a preset attenuation speed, which may be set to be 0.05 according to a preferred embodiment of the present invention. It should be understood that this preferred value is also only exemplary, but not intended to limit the same. In fact, the preset attenuation speed may be set according to actual needs. Suppose that the current energy of each frequency band in a path attenuation of a sound is p, the number of frequency bands is $N_{bands}$, the subscript of frequency bands is ω, and the energy attenuation coefficient of each frequency band (that is, a fade-in and fade-out energy coefficient) of this path is g, and the energy b on the sound propagation path of each frequency band may be calculated by a plurality of calculation methods. As an example, two common calculation methods are provided below. Assuming that the energy threshold is epsilon, whether the energy b is less than the threshold may be calculated by either of the following two common calculation methods:

$$b = \frac{\sum_{\omega=0}^{N_{bands}-1} p(\omega)}{N_{bands}} * g < \text{epsilon}, \quad \text{(formula 3)}$$

$$\text{or } b = \max(p(\omega)) < \text{epsilon}, \; \omega \in [0, N_{bands} - 1]$$

Wherein, epsilon may use any very small floating-point number, which determines a minimum energy intensity of the rendered path energy. In some embodiments of the present disclosure, epsilon=0.0001 (−40 dBfs energy) may be used.

Figure 4:
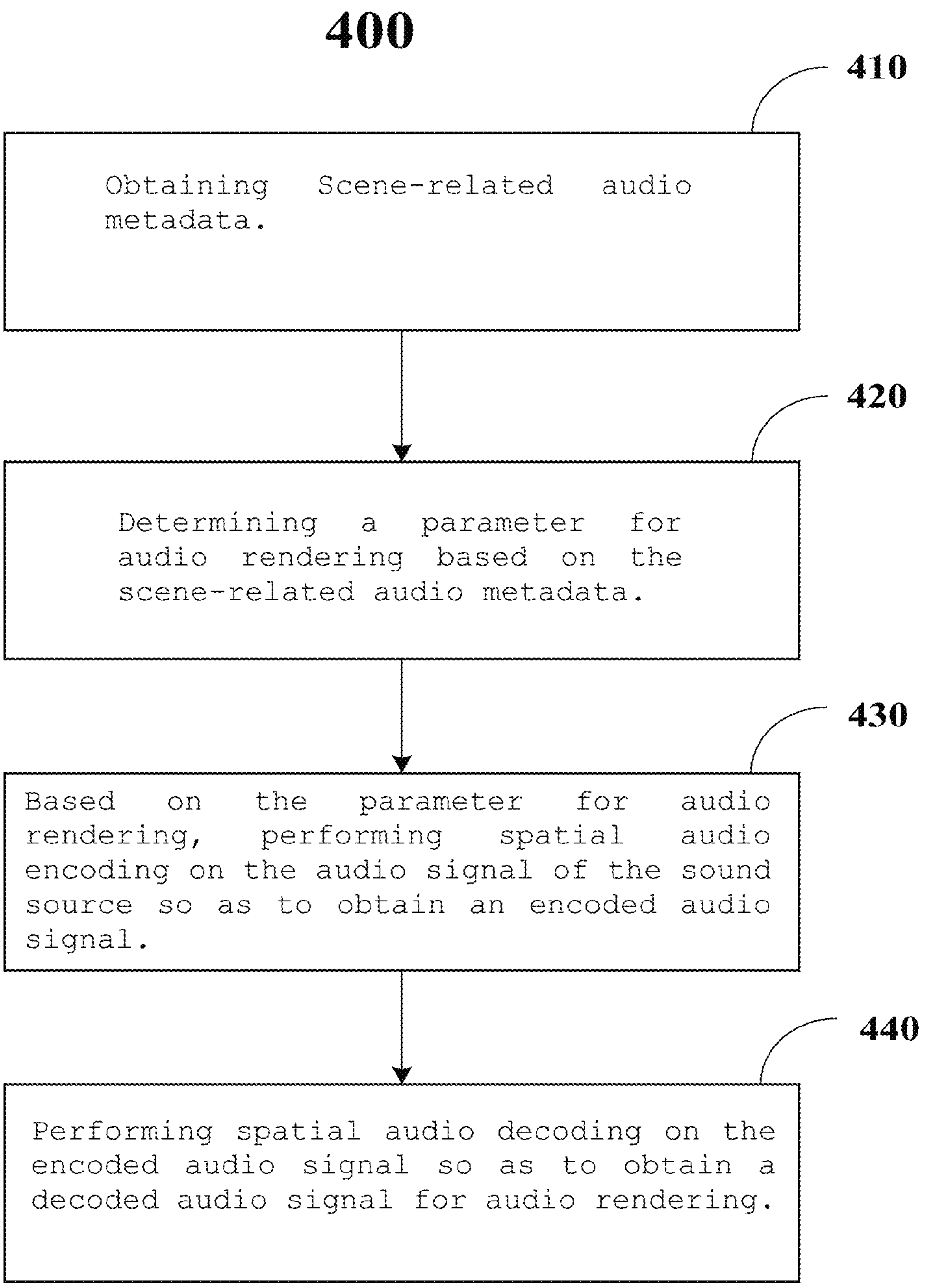
FIG. 4 shows a flow chart of some embodiments of an audio rendering method of the present disclosure.

FIG. 4 shows an exemplary flow chart of an audio rendering method according to an embodiment of the present disclosure.

As shown in FIG. 4, in step S410, scene-related audio metadata is obtained. According to an embodiment of the invention, the scene-related audio metadata may comprise acoustic environment information, for example, information related to a sound propagation path between a sound source and a listener, which comprises but is not limited to the state and energy of the sound propagation path.

As recited previously, the state of the sound propagation path between a sound source and a listener comprises effective and ineffective, as well as blocked and unblocked sub-states in the effective state. When the energy of the sound propagation path is less than a threshold, the state of the sound propagation path is judged to be ineffective; otherwise, the state of the sound propagation path is judged to be effective. When it is detected that the ray pertaining to the sound propagation path intersects with the scene, it is judged that the sound propagation path is blocked; otherwise, it is determined that the sound propagation path is unblocked.

In step S420, a parameter for audio rendering are determined based on the scene-related audio metadata. According to an embodiment of the present invention, the parameter for audio rendering comprises an energy attenuation coefficient for each sound propagation path.

In step S430, based on the parameter for audio rendering, spatial audio encoding is performed on the audio signal of the sound source so as to obtain an encoded audio signal.

In step S440, spatial audio decoding is performed on the encoded audio signal so as to obtain a decoded audio signal for audio rendering.

According to some embodiments of the present invention, the determining a parameter for audio rendering based on the scene-related audio metadata may comprise adjusting an energy attenuation coefficient of each sound propagation path based on the relevant information (for example, state and energy) of the sound propagation path.

According to some embodiments of the present invention, the adjusting an energy attenuation coefficient of each sound propagation path comprises: first judging whether the path is effective by comparing the energy of the sound propagation path with a threshold, and then judging whether the sound propagation path is blocked in the case where the path is effective. Specifically, when the energy of the sound propagation path is less than a threshold, the state of the sound propagation path is judged to be ineffective, and the sound propagation path is deleted. When the energy of the sound propagation path is not less than a threshold, the state of the sound propagation path is judged to be effective.

As recited previously, the state of the sound propagation path is detected or judged each time when spatial audio rendering is performed. In other words, for spatial audio rendering of each frame, the state of the sound propagation path is detected or judged.

In the case where the state of the sound propagation path is judged to be effective, it is further judged whether the sound propagation path is blocked; in the case where the sound propagation path is blocked, the energy attenuation coefficient is reduced frame by frame; and in the case where the sound propagation path is unblocked, the energy attenuation coefficient is increased frame by frame until the energy attenuation coefficient is 1.

According to some embodiments of the present invention, the reducing the energy attenuation coefficient frame by frame in the case that the sound propagation path is blocked comprises: multiplying the current energy attenuation coefficient by a preset exponential attenuation speed or decreasing a preset linear attenuation speed on a basis of the current energy attenuation coefficient in response to judging that the sound propagation path is blocked.

Here, the energy of the sound propagation path may be calculated by a plurality of methods, for example, those recited in the above-described formula 3; for example, a maximum value of the current energy of each frequency band during energy attenuation is taken as the energy of the sound propagation path or the product of the average energy of each frequency band during energy attenuation and the energy attenuation coefficient is taken as the energy of the sound propagation path.

According to some embodiments of the present invention, the increasing the energy attenuation coefficient frame by frame until the energy attenuation coefficient is 1 in the case where the sound propagation path is unblocked comprises: determining the energy attenuation coefficient of each frame as a minimum of 1 and the following value frame by frame: $1-\exp*(1-g_{old})$, where exp is the exponential attenuation speed, $g_{old}$ is the energy attenuation coefficient of a previous frame; or determining the energy attenuation coefficient of each frame as a minimum of 1 and the following value frame by frame: $g_{old}$+delta, where delta is the linear attenuation speed and $g_{old}$ is the energy attenuation coefficient of a previous frame.

In the present disclosure, by judging whether the state of the sound propagation path is "effective" or "ineffective", and further judging whether each sound propagation path is "blocked" in the case where the sound propagation path is "effective", the sound propagation path judged to be "blocked" is not deleted immediately, but to reduce its energy coefficient frame by frame, and at the same time, for the sound propagation path judged to be unblocked, its energy coefficient is promoted frame by frame, which solves abrupt rise/drop of sound energy in some directions resulting from suddenly appearing/disappearing sound paths in geometric acoustics simulation, so that the exhibited sound effect is smooth and noiseless.

Figure 5:
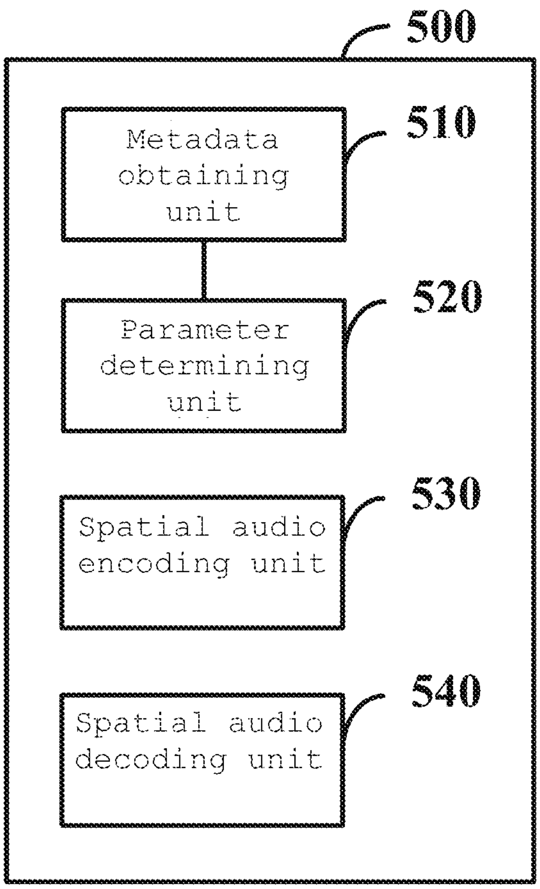
FIG. 5 shows a structural block view of some embodiments of an audio rendering apparatus of the present disclosure.

In an embodiment of the present disclosure, an audio rendering apparatus is provided, and FIG. 5 shows a schematic structural block view of the audio rendering apparatus. As shown in FIG. 5, the audio rendering apparatus 500 comprises a metadata obtaining unit 510, a parameter determining unit 520, a spatial audio encoding unit 530 and a spatial audio decoding unit 540.

According to an embodiment of the present invention, the metadata obtaining unit 510 is configured to obtain scene-related audio metadata, which may comprise, for example, relevant information of the sound propagation path between a sound source and a listener, comprising but not limited to the state and energy of the sound propagation path.

According to an embodiment of the present invention, the parameter determining unit 520 is configured to determine a parameter for audio rendering based on the scene-related audio metadata, wherein the parameter for audio rendering comprises an energy attenuation coefficient for each sound propagation path.

According to an embodiment of the present invention, the spatial audio encoding unit 530 is configured to perform spatial audio encoding on an audio signal of a sound source based on the parameter for audio rendering so as to obtain an encoded audio signal.

According to an embodiment of the present invention, the spatial audio decoding unit 540 is configured to perform spatial audio decoding on the encoded audio signal so as to obtain a decoded audio signal for audio rendering.

As recited previously, the state of the sound propagation path between a sound source and a listener comprises effective and ineffective, as well as blocked and unblocked sub-states in the effective state, which will not be described in detail here.

It should also be understood that the parameter for audio rendering recited previously may be used to perform spatial encoding on an audio signal in the spatial encoding module in FIG. 2.

According to some embodiments of the present invention, the parameter determining unit 520 may be further configured to adjust an energy attenuation coefficient of each sound propagation path based on the relevant information (for example, state and energy) of the sound propagation path.

According to some embodiments of the present invention, the adjusting an energy attenuation coefficient of each sound propagation path comprises: first judging whether the path is effective by comparing the energy of the sound propagation path with a threshold, and then determining whether the sound propagation path is blocked in the case where the path is effective. Specifically, when the energy of the sound propagation path is less than a threshold, the state of the sound propagation path is judged to be ineffective, and the sound propagation path is deleted. When the energy of the sound propagation path is not less than a threshold, the state of the sound propagation path is judged to be effective.

As recited previously, the state of the sound propagation path is detected or judged each time when spatial audio rendering is performed.

In the case where the state of the sound propagation path is judged to be effective, it is further judged whether the sound propagation path is blocked; in the case where the sound propagation path is blocked, the energy attenuation coefficient is reduced frame by frame; and in the case where the sound propagation path is unblocked, the energy attenuation coefficient is increased frame by frame until the energy attenuation coefficient is 1.

According to some embodiments of the present invention, the reducing the energy attenuation coefficient frame by frame in the case that the sound propagation path is blocked comprises: multiplying the current energy attenuation coefficient by a preset exponential attenuation speed or decreasing a preset linear attenuation speed on a basis of the current energy attenuation coefficient in response to judging that the sound propagation path is blocked.

Here, the energy of the sound propagation path may be calculated by a plurality of methods, for example, those recited in the above-described formula 3; for example, a maximum value of the current energy of each frequency band during energy attenuation is taken as the energy of the sound propagation path, or the product of the average energy of each frequency band during energy attenuation and the energy attenuation coefficient is taken as the energy of the sound propagation path.

According to some embodiments of the present invention, the increasing the energy attenuation coefficient frame by frame until the energy attenuation coefficient is 1 in the case where the sound propagation path is unblocked comprises: determining the energy attenuation coefficient of each frame as a minimum of 1 and the following value frame by frame: $1-\exp*(1-g_{old})$, where exp is the exponential attenuation speed, $g_{old}$ is the energy attenuation coefficient of a previous frame; or determining the energy attenuation coefficient of each frame as a minimum of 1 and the following value frame by frame: $g_{old}$+delta, where delta is the linear attenuation speed and $g_{old}$ is the energy attenuation coefficient of a previous frame.

Figure 6:
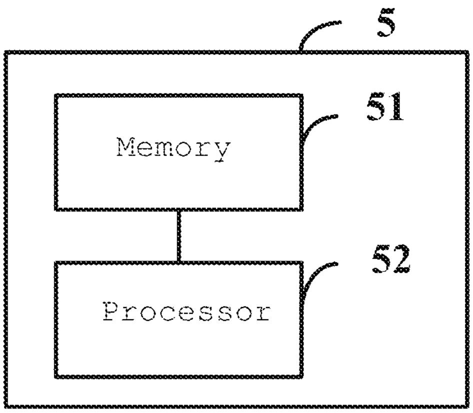
FIG. 6 shows a block view of some embodiments of an electronic apparatus of the present disclosure.

FIG. 6 shows a block view of some embodiments of an electronic apparatus of the present disclosure.

As shown in FIG. 6, the electronic apparatus 5 of this embodiment comprises: a memory 51 and a processor 52 coupled to the memory 51, wherein the processor 52 is configured to perform a reverberation duration estimating method or an audio signal rendering method according to any of the embodiments of the present disclosure based on instructions stored in the memory 51.

Wherein, the memory 51 may comprise, for example, a system memory, a fixed non-volatile storage medium, or the like. The system memory stores, for example, an operation system, an application, a boot loader, a database and other programs.

Figure 7:
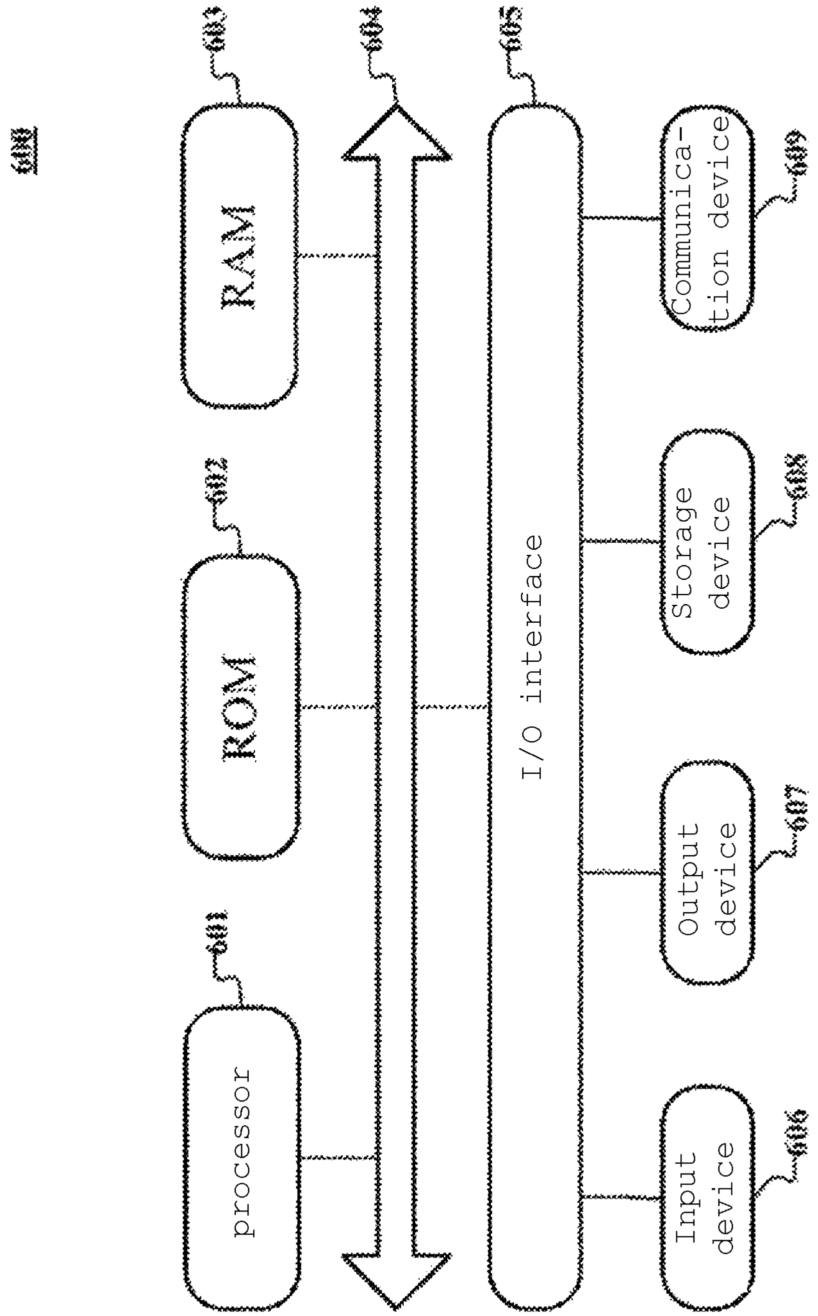
FIG. 7 shows a block view of other embodiments of an electronic apparatus of the present disclosure.

Next, referring to FIG. 7, a schematic structural view of an electronic apparatus suitable for implementing an embodiment of the present disclosure is shown. The electronic apparatus in an embodiment of the present disclosure may comprise, but is not limited to, mobile terminals such as mobile phones, notebook computers, digital broadcast receivers, PDA (personal digital assistants), PAD (pad computers), PMP (Portable Multimedia Players) in-vehicle terminals (for example, in-vehicle navigation terminals) and the like; and fixed terminals such as digital TVs, desktop computers and the like. The electronic apparatus shown in FIG. 7 is only an example and shall not limit the functions and application range of the embodiments of the present disclosure.

FIG. 7 shows a block view of an electronic apparatus according to other embodiments of the present disclosure.

As shown in FIG. 7, the electronic apparatus may comprise a processing device (for example, a central processing unit, a graphics processor or the like) 601, which may perform various appropriate actions and processing according to a program stored in a read-only memory (ROM) 602 or a program loaded from a storage device 608 into a random access memory (RAM) 603. In the RAM 603, various programs and data required for the operation of the electronic apparatus are also stored. The processing device 601, the ROM 602 and the RAM 603 are connected to each other through a bus 604. The input/output (I/O) interface 605 is also connected to the bus 604.

Generally, the following devices may be connected to the I/O interface 605: an input device 606 comprising, for example, a touch screen, a touch pad, a keyboard, a mouse, an image sensor, a microphone, an accelerometer, a gyroscope, and the like; an output device 607 comprising, for example, a liquid crystal display (LCD), a speaker, a vibrator, and the like; a storage device 608 comprising, for example, a magnetic tape, a hard disk, and the like; and a communication device 609. The communication device 609 may allow the electronic apparatus to be in wireless or wired communication with other devices to exchange data. Although FIG. 7 shows the electronic apparatus provided with various devices, it should be understood that there is no requirement to implement or possess all the devices shown. It is possible to alternatively implement or possess more or less devices.

According to an embodiment of the present disclosure, the process described above with reference to the flow chart may be implemented as a computer software program. For example, in an embodiment of the present disclosure, a computer program product is comprised, which comprises a computer program carried on a computer-readable medium, wherein the computer program contains program codes for performing the method shown in the flow chart. In such embodiment, the computer program may be downloaded and installed from network through the communication device 609, or installed from the storage device 608, or installed from the ROM 602. When the computer program is executed by the processing device 601, the above-described functions defined in the method of an embodiment of the present disclosure are performed.

In some embodiments, a chip is also provided, which comprises: at least one processor and an interface for providing computer-executed instructions for the at least one processor, wherein the at least one processor is configured to execute the computer-executed instructions, so as to implement a reverberation duration estimating method or an audio signal rendering method according to any of the above-described embodiments.

Figure 8:
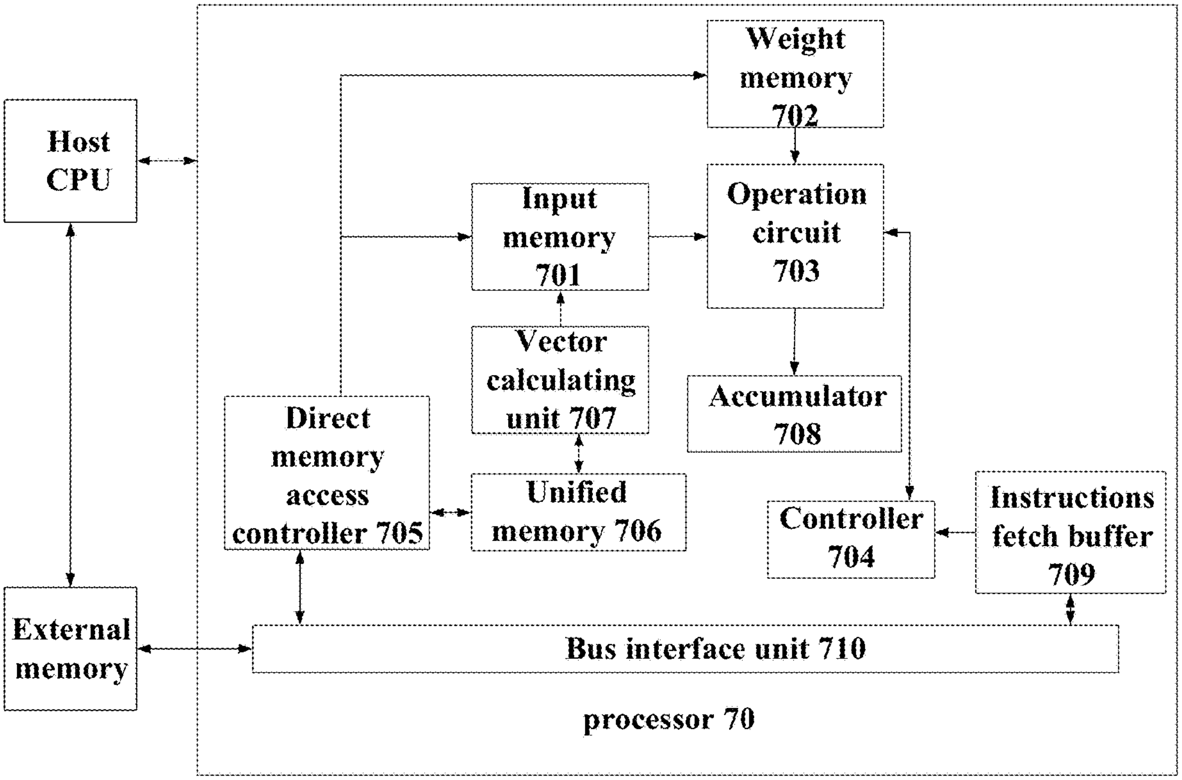
FIG. 8 shows a block view of some embodiments of a chip of the present disclosure.

FIG. 8 shows a block view of some embodiments of a chip of the present disclosure.

As shown in FIG. 8, the processor 70 of the chip is mounted on a Host CPU as a co-processor, so that tasks are assigned by the host CPU. The core part of the processor 70 is an operation circuit, and the controller 704 controls the operation circuit 703 to extract data in the memory (a weight memory or input memory) and perform operation.

In some embodiments, the operation circuit 703 internally comprises a plurality of process engines (PE). In some embodiments, the operation circuit 703 is a two-dimensional systolic array. The operation circuit 703 may also be a one-dimensional systolic array or other electronic circuits capable of performing mathematical operations such as multiplication and addition. In some embodiments, the operation circuit 703 is a general matrix processor.

For example, suppose an input matrix A, a weight matrix B and an output matrix V. The operation circuit extracts data corresponding to the matrix B from the weight memory 702 and buffers the same on each PE in the operation circuit. The operation circuit extracts data of the matrix A from the input memory 701 and performs matrix operation with the matrix B, so that a partial result or a final result of the matrix is obtained and is saved in an accumulator 708.

The vector calculating unit 707 may further process the output of the operation circuit, for example, the process may be vector multiplication, vector addition, exponential operation, logarithmic operation, size comparison and the like.

In some embodiments, the vector calculating unit 707 may store the processed output vector to a unified memory 706. For example, the vector calculating unit 707 may apply a non-linear function to the output of the operation circuit 703, for example, a vector of accumulated values, to generate an activation value. In some embodiments, the vector calculating unit 707 generates a normalized value, a combined value, or both. In some embodiments, the processed output vector can serve as an activation input to the operation circuit 703, for example, for use in a subsequent layer in a neural network.

The unified memory 706 is configured to store input data and output data.

The direct memory access controller 705 (DMAC) transports the input data in the external memory to the input memory 701 and/or the unified memory 706, saves the weight data in the external memory into the weight memory 702, and saves the data in the unified memory 706 into the external memory.

A bus interface unit (BIU) 510 is configured to realize the interaction among the main CPU, DMAC and an instruction fetch buffer 709 through the bus.

The instruction fetch buffer 709 connected to the controller 704 is configured to store instructions used by the controller 704.

The controller 704 is configured to call instructions cached in the instruction fetch buffer 709 so as to implement controlling the working process of the operation accelerator.

Generally, the unified memory 706, the input memory 701, the weight memory 702 and the instruction fetch buffer 709 are all On-Chip memories, and the external memory is a memory external of NPU, wherein the external memory may be a double data rate synchronous dynamic random access memory (DDR SDRAM), a high bandwidth memory (HBM) or other readable and writable memories.

In some embodiments, a computer program is also provided, which comprises: instructions that, when executed by a processor, cause the processor to perform a reverberation duration estimating method or an audio signal rendering method according to any of the above-described embodiments.

It should be understood by those skilled in the art that the present disclosure may take the form of a hardware only embodiment, a software only embodiment, or a hardware and software combined embodiment. When implemented by using a software, the above-described embodiments may be entirely or partly implemented in the form of a computer program product. The computer program product comprises one or more computer instructions or computer programs. When computer instructions or computer programs are loaded or executed on a computer, the flows or functions according to an embodiment of the present application are entirely or partly generated. The computer may be a general-purpose computer, a special-purpose computer, a computer network, or other programmable devices. Moreover, the present disclosure may take the form of a computer program product embodied in one or more computer-usable non-transitory storage media (comprising but not limited to a disk memory, CD-ROM, an optical memory, and the like) containing computer usable program codes therein.

Although some specific embodiments of the present disclosure have been described in detail by way of examples, those skilled in the art should understand that the above examples are only for an illustrative purpose, rather than limiting the scope of the present disclosure. It should be understood by those skilled in the art that modifications to the above embodiments may be made without departing from the scope and spirit of the present disclosure. The scope of the present disclosure is defined by the appended claims.

What is claimed is:

1. An audio rendering method, comprising:

obtaining scene-related audio metadata, wherein the scene-related audio metadata comprises a state and an energy of each sound propagation path between a sound source and a listener;

determining a parameter for audio rendering based on the audio metadata, wherein the parameter for audio rendering comprises an energy attenuation coefficient for each sound propagation path, and wherein determining the parameter for audio rendering based on the audio metadata comprises adjusting the energy attenuation coefficient of each sound propagation path based on the state and the energy of the sound propagation paths;

performing spatial audio coding on an audio signal of the sound source based on the parameter for audio rendering so as to obtain an encoded audio signal; and performing spatial audio decoding on the encoded audio signal so as to obtain a decoded audio signal for audio rendering.

2. The audio rendering method according to claim 1, wherein the adjusting an energy attenuation coefficient of each sound propagation path based on the state and the energy of the sound propagation path comprises:

when the energy of the sound propagation path is less than a threshold, judging that the state of the sound propagation path is ineffective and deleting the sound propagation path;

when the energy of the sound propagation path is not less than the threshold, determining that the state of the sound propagation path is effective; and judging whether the sound propagation path is blocked in a case where the state of the sound propagation path is judged to be effective:

reducing the energy attenuation coefficient frame by frame in a case where the sound propagation path is blocked; and increasing the energy attenuation coefficient frame by frame until the energy attenuation coefficient is 1 in a case where the sound propagation path is unblocked.

3. The audio rendering method according to claim 2, wherein the reducing the energy attenuation coefficient frame by frame in a case where the sound propagation path is blocked comprises:

multiplying a current energy attenuation coefficient by a preset exponential attenuation speed.

4. The audio rendering method according to claim 2, wherein the reducing the energy attenuation coefficient frame by frame in a case where the sound propagation path is blocked comprises:

decreasing the preset linear attenuation speed on a basis of a current energy attenuation coefficient.

5. The audio rendering method according to claim 2, wherein the energy of the sound propagation path is:

a maximum value of a current energy of each frequency band during energy attenuation.

6. The audio rendering method according to claim 2, wherein the energy of the sound propagation path is:

a product of an average energy of each frequency band during energy attenuation and the energy attenuation coefficient.

7. The audio rendering method according to claim 2, wherein the increasing the energy attenuation coefficient frame by frame until the energy attenuation coefficient is 1 in a case where the sound propagation path is unblocked comprises:

determining the energy attenuation coefficient of each frame as a minimum of 1 and the following value frame by frame: $1-\exp*(1-g_{old})$, where exp is an exponential attenuation speed, and $g_{old}$ is the energy attenuation coefficient of a previous frame.

8. The audio rendering method according to claim 2, wherein the increasing the energy attenuation coefficient frame by frame until the energy attenuation coefficient is 1 in a case where the sound propagation path is unblocked comprises:

determining the energy attenuation coefficient of each frame as a minimum of 1 and the following value frame by frame: $g_{old}$+delta, where delta is a linear attenuation speed, and $g_{old}$ is the energy attenuation coefficient of a previous frame.

9. An electronic apparatus comprising:

a memory; and a processor coupled to the memory, wherein the processor is configured to perform an audio rendering method based on instructions stored in the memory device, the method comprising:

obtaining scene-related audio metadata, wherein the scene-related audio metadata comprises a state and an energy of each sound propagation path between a sound source and a listener;

determining a parameter for audio rendering based on the audio metadata, wherein the parameter for audio rendering comprises an energy attenuation coefficient for each sound propagation path, and wherein determining the parameter for audio rendering based on the audio metadata comprises adjusting the energy attenuation coefficient of each sound propagation path based on the state and the energy of the sound propagation paths;

performing spatial audio coding on an audio signal of the sound source based on the parameter for audio rendering so as to obtain an encoded audio signal; and performing spatial audio decoding on the encoded audio signal so as to obtain a decoded audio signal for audio rendering.

10. The electronic apparatus according to claim 9, wherein the adjusting an energy attenuation coefficient of each sound propagation path based on the state and the energy of the sound propagation path comprises:

when the energy of the sound propagation path is less than a threshold, judging that the state of the sound propagation path is ineffective and deleting the sound propagation path;

when the energy of the sound propagation path is not less than the threshold, determining that the state of the sound propagation path is effective; and judging whether the sound propagation path is blocked in a case where the state of the sound propagation path is judged to be effective:

reducing the energy attenuation coefficient frame by frame in a case where the sound propagation path is blocked; and increasing the energy attenuation coefficient frame by frame until the energy attenuation coefficient is 1 in a case where the sound propagation path is unblocked.

11. The electronic apparatus according to claim 10, wherein the reducing the energy attenuation coefficient frame by frame in a case where the sound propagation path is blocked comprises:

multiplying a current energy attenuation coefficient by a preset exponential attenuation speed.

12. The electronic apparatus according to claim 10, wherein the reducing the energy attenuation coefficient frame by frame in a case where the sound propagation path is blocked comprises:

decreasing the preset linear attenuation speed on a basis of a current energy attenuation coefficient.

13. The electronic apparatus according to claim 10, wherein the energy of the sound propagation path is:

a maximum value of a current energy of each frequency band during energy attenuation.

14. The electronic apparatus according to claim 10, wherein the energy of the sound propagation path is:

a product of an average energy of each frequency band during energy attenuation and the energy attenuation coefficient.

15. The electronic apparatus according to claim 10, wherein the increasing the energy attenuation coefficient frame by frame until the energy attenuation coefficient is 1 in a case where the sound propagation path is unblocked comprises:

determining the energy attenuation coefficient of each frame as a minimum of 1 and the following value frame by frame: $1-\exp*(1-g_{old})$, where exp is an exponential attenuation speed, and $g_{old}$ is the energy attenuation coefficient of a previous frame.

16. The electronic apparatus according to claim 10, wherein the increasing the energy attenuation coefficient frame by frame until the energy attenuation coefficient is 1 in a case where the sound propagation path is unblocked comprises:

determining the energy attenuation coefficient of each frame as a minimum of 1 and the following value frame by frame: $g_{old}$+delta, where delta is a linear attenuation speed, and $g_{old}$ is the energy attenuation coefficient of a previous frame.

17. A non-transitory computer-readable storage medium having a computer program stored thereon, that, when executed by a processor, implements an audio rendering method comprising:

obtaining scene-related audio metadata, wherein the scene-related audio metadata comprises a state and an energy of each sound propagation path between a sound source and a listener;

determining a parameter for audio rendering based on the audio metadata, wherein the parameter for audio rendering comprises an energy attenuation coefficient for each sound propagation path, and wherein determining the parameter for audio rendering based on the audio metadata comprises adjusting the energy attenuation coefficient of each sound propagation path based on the state and the energy of the sound propagation paths;

performing spatial audio coding on an audio signal of the sound source based on the parameter for audio rendering so as to obtain an encoded audio signal; and performing spatial audio decoding on the encoded audio signal so as to obtain a decoded audio signal for audio rendering.

18. The non-transitory computer-readable storage medium according to claim 17, wherein the adjusting an energy attenuation coefficient of each sound propagation path based on the state and the energy of the sound propagation path comprises:

when the energy of the sound propagation path is less than a threshold, judging that the state of the sound propagation path is ineffective and deleting the sound propagation path;

when the energy of the sound propagation path is not less than the threshold, determining that the state of the sound propagation path is effective; and judging whether the sound propagation path is blocked in a case where the state of the sound propagation path is judged to be effective:

reducing the energy attenuation coefficient frame by frame in a case where the sound propagation path is blocked; and increasing the energy attenuation coefficient frame by frame until the energy attenuation coefficient is 1 in a case where the sound propagation path is unblocked.

* * * * *